COMPUTER MEMORY TRANSFER SYSTEM

Filed Oct. 28, 1968 3 Sheets-Sheet 1

EDWIN A. SLOANE
EDGAR ALLEN POE, III
MARTIN FLETCHER
RICHARD WEXLER
ROBERT SACKMAN
INVENTORS

BY Spensley & Horn
ATTORNEYS

COMPUTER MEMORY TRANSFER SYSTEM

Filed Oct. 28, 1968

3 Sheets-Sheet 2

EDWIN A. SLOANE
EDGAR ALLEN POE, III
MARTIN FLETCHER
RICHARD WEXLER
ROBERT SACKMAN
INVENTORS

BY Spensley & Horn
ATTORNEYS

COMPUTER MEMORY TRANSFER SYSTEM

Filed Oct. 28, 1968 3 Sheets-Sheet 3

EDWIN A. SLOANE
EDGAR ALLEN POE III
MARTIN FLETCHER
RICHARD WEXLER
ROBERT SACKMAN
INVENTORS

BY Spensley & Horn
ATTORNEYS

United States Patent Office 3,514,762
Patented May 26, 1970

3,514,762

COMPUTER MEMORY TRANSFER SYSTEM

Edwin Sloane, Los Altos, Edgar Allan Poe III, and Martin Fletcher, Palo Alto, Richard Wexler, Menlo Park, and Robert Sackman, Atherton, Calif., assignors to Time Data Corporation, Palo Alto, Calif., a corporation of California

Filed Oct. 28, 1968, Ser. No. 771,145
Int. Cl. G06f *3/00*
U.S. Cl. 340—172.5 6 Claims

ABSTRACT OF THE DISCLOSURE

A computer memory transfer system for transferring signals stored in the input, output or in-process sections of a computer memory to other sections of the computer memory by manual selection means. In addition, the system permits a single word to be transferred from a keyboard to any section of the computer memory.

BACKGROUND OF THE INVENTION

Field of the invention

The invention relates to the field of transfer systems for a computer.

Description of the prior art

High-speed digital computers in general require programming for the solution of problems. The field of programming computers in itself has developed into a substantial industry. The need for such programming makes the use of high speed digital computers much more inconvenient, expensive and time consuming; and therefore, inaccessible to certain classes of users. For example, small laboratories, hospitals and other individual scientists have a requirement for digital computers and may be without them because of the cost and expense involved in programming.

The computer industry has, in part, responded to this shortcoming by developing low cost digital computer systems which do not require programming. For the most part, these computers are special purpose computers specifically designed to solve specific problems. These computers generally solve one or several problems and employ analog as well as digital techniques. In some instances, to add flexibility to these specialized computers some systems have been employed using patch board programmers. This again adds complexity which is unsuitable for the laboratory technician or scientist unskilled in computer techniques.

In addition, the problem of inputting data to a digital computer, even a single word, generally requires the use of magnetic tapes or punch cards. This is an inconvenient method for most technicians or scientists who wish to input data by a more simplified means.

SUMMARY OF THE INVENTION

The transfer system is intended for use in a computer containing an input, output and in-process signal storage means and a processor for solving any of a plurality of problems (which may in part be related), particularly time domain to frequency domain transforms such as the Fourier transform. Transfer means are provided for allowing the operator to manually select the signals stored in the input, output and in-process sections of the computer memory and transfer the contents to another section of the computer memory. A keyboard and thumbwheel means are provided to allow the operator to manually select the value of a digital word and its address and transfer the word into any section of the computer memory.

DETAILED DESCRIPTION OF THE PREFERRED EMBODIMENT

Figure 1:
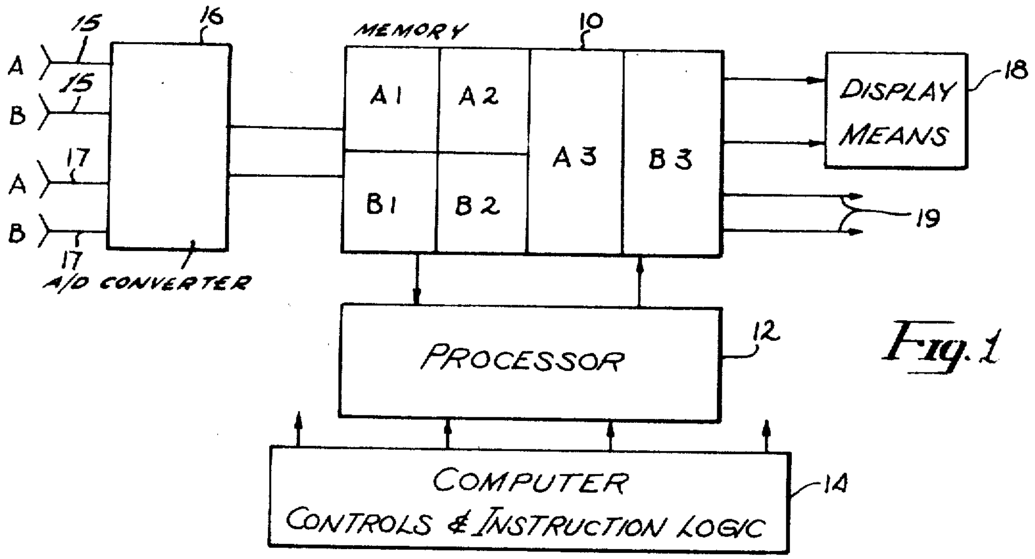
FIG. 1 is a block diagram of a computer.

In FIG. 1, the major subsystems of a computer are shown as input means 16, memory storage means 10, processor means 12, display means 18, and control and instruction logic means 14. The illustrated computer is a computer for solving any one of a plurality of problems such as, the algorithms for obtaining the Fourier transform, spectral analysis, averaging, auto-correlation, cross-correlation, convolution and histogram of an input signal. The computer contains a prewired program allowing the operator to select any one of a number of algorithms without the necessity of providing a program for the selected algorithm. For example, see FIG. 3 numeral 8.

Input means 16 is coupled to memory means 10 and performs the function of transforming analog signals to digital signals before they are stored in memory means 10. Leads 17 are provided for receiving digital input signals and leads 15 are provided for receiving analog input signals to input means 16. These leads are used to read digital inputs directly into memory 10. The illustrated computer is capable of receiving input data on two channels designated A and B in FIG. 1. It is understood that memory means 10 contains the usual circuitry for accessing, storing, and temporary storage.

Memory means 10 may be a word organized magnetic core memory storage device commonly utilized in the computer art for storage electrical signals. Typical memory means 10 may have a total capacity of 4096 18-bit words, organized in six (6) sections designated A1, A2, B1, B2, A3 and B3 in FIG. 1. Sections A1 and B1 are utilized for storing input data in the form of 8-bit words for channels A and B. Each word from channel A and B share an 18-bit cell in these sections. A2 and B2 are organized in the same manner as sections A1 and B1 and are utilized for storing in-process data. The sections A1, B1 A2 and B2 utilize addresses from 0000 through 2047. Sections A3 and B3 are the output sections and each store 1024 18-bit words. A3 utilizes addresses from 2048 through 3071, and B3 utilizes addresses from 3072 through 4095.

The processor 12 may be one utilized for solving the algorithms previously described. The processor may contain a prewired program allowing the operator to select any one of a plurality of algorithms by manual selection means (FIG. 3, numeral 8) and without the need for providing a program for the computer. The algorithms available are such that the results of one computation may be employed in a subsequent computation. For example, the following table indicates the manner in which certain available algorithms may be combined:

| Initial Input(s) | First Process | First Result | Auxiliary Input |
|---|---|---|---|
| Time function | Auto spectral | Auto spectrum | Convolution kernel. |
| A sample of data and an impulse. | Cross correlation | Inverted data sample | Time series. |
| Frequency functions | Complex multiply | Complex product | |
| Time function ensemble | Averaged auto spectral | Averaged spectrum | Convolution kernel. |
| Time domain ensembles | Averaged cross spectral | Averaged cross spectrum | |
| Auto correlation function and lag window. | Real multiply | Weighted correlation function. | |
| Time function | Fourier transform | Fourier transformation | |

| Initial Input(s) | Second Process | Second Result | Remarks |
|---|---|---|---|
| Time function | Block convolution | Smoothed spectrum | Stable estimate of spectrum based on a single data sample. |
| A sample of data and an impulse. | Real-time convolution | Matched filter detector | Synthesis of a matched filter from empirical data. |
| Frequency functions | Inverse fourier transform | Convolution | Frequency domain filtering. |
| Time function ensemble | Block convolution | Smoothed averaged spectrum. | |
| Time domain ensembles | Inverse fourier transform | Averaged cross correlation. | A method for increasing effective frame size for a limited set of lag values. |
| Auto correlation function and lag window. | Fourier transform | Real part smoothed spectrum. | The "indirect" method for smoothed spectrum. |
| Time function | Inverse fourier transform. | Generation of analytic complex function, u(t) + jv(t) from the real function, u(t). | |

Means 14 is the control and instruction logic means for the computer. Included within this means is the control panel illustrated in FIG. 3. Means 14 provides the logic, instructions and basic timing for the computer.

Display means 18 is the display system for the computer; it permits display of the input and/or output data stored in memory means 10.

Figure 4:
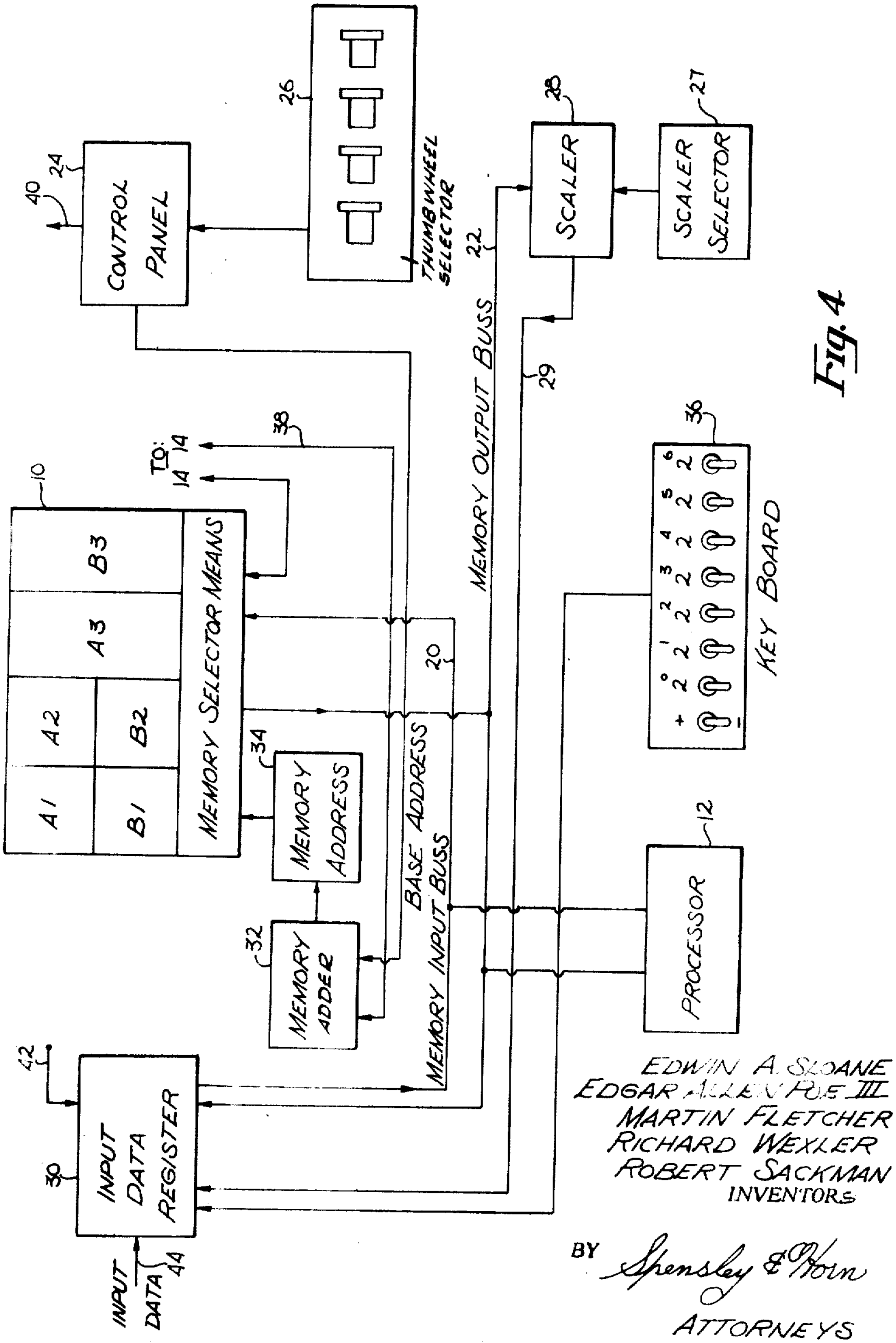
FIG. 4 is a block diagram of the transfer means and its interconnection with a computer.

FIG. 4 illustrates a block diagram for the transfer means and its interconnection with the computer. The transfer means is composed of input data register 30, memory adder means 32, memory address means 34, control panel 24, thumbwheel selector means 26, scaler means 28 and keyboard means 36.

Input data register means 30 typically consists of an 18 pole, 4 throw switch and a register for storing 18-bits of information. Means 30 may be constructed utilizing digital circuitry such as employed in the computer art. The switch within means 30 provides connection between memory input bus 20 and alternatively memory output bus 22, scaler 28, keyboard 36 and input data bus 44. Register means 30 receives switching information via lead 42 from means 14 of FIG. 1.

Adder means 32 and memory address 34 provide the proper address for each word during the transfer operation. Adder means 32 adds "one" to the basic address furnished it by control panel 24 each time it receives a signal from lead 38 which is connected to control and instruction logic 14 that provides timing and control signals. Adder means 32 may be any digital adding means commonly utilized in the computer art. Memory address means 34 provides the address for each word stored in means 10. The address is provided to memory address means 34 by memory adder means 32 in digital form. Address means 34 converts the address into a form compatible with the word organized logic utilized by memory 10. Such address means 34 are well known in the computer art. Memory adder 32 is coupled to control panel 24 and lead 38. Address means 34 is coupled to adder means 32 and memory means 10.

Control panel means 24 provides the source and destination of the data to be transferred. Control panel means 24 includes the manual controls and circuitry to provide signals indicative of the selection made by the operator indicating any one of the nine sources and seven destinations and may be constructed of commonly utilized logic circuitry. The signals of panel means 24 are transmitted to the computer control and instruction logic means 14 of FIG. 1 through lead 40, and the source and destination data selected by the operator is transmitted to adder means 32.

Means 26 is a thumbwheel selector switch for selecting a four digit number with marking thereon to indicate the selected number, and for providing an electrical signal indicative of the selected number. Thumbwheel means 26 may be any of numerous selector switches providing either an analog or digital signal representative of the selected number. The thumbwheel means 26 is coupled to control means 24 and provides means 24 with an electrical signal representative of the selected 4 digit number.

Scaler means 28 is digital means for selecting any seven (7) adjacent bits plus the sign bit of an 18-bit word. Scaler means 28 may be constructed of commonly utilized computer circuitry. Means 28 is coupled to memory output bus 22, register means 30 and scaler switch 27.

Scaler selector means 27 is a selector switch for indicating the selection of any one of eleven (11) positions and for transmitting an electrical signal representative of the selected position to scaler 28. Selector 27 may be any one of a number of commercially available selector switches.

Keyboard means 36, coupled to input data register 30, is a keyboard for selecting the value of an 8-bit digital word and providing an electrical signal representative thereof. Each of the switches contained on keyboard means 36 indicates the state of each bit composing an 8-bit word. Keyboard means 36 can be constructed of 8 single pole single throw switches.

Figure 3:
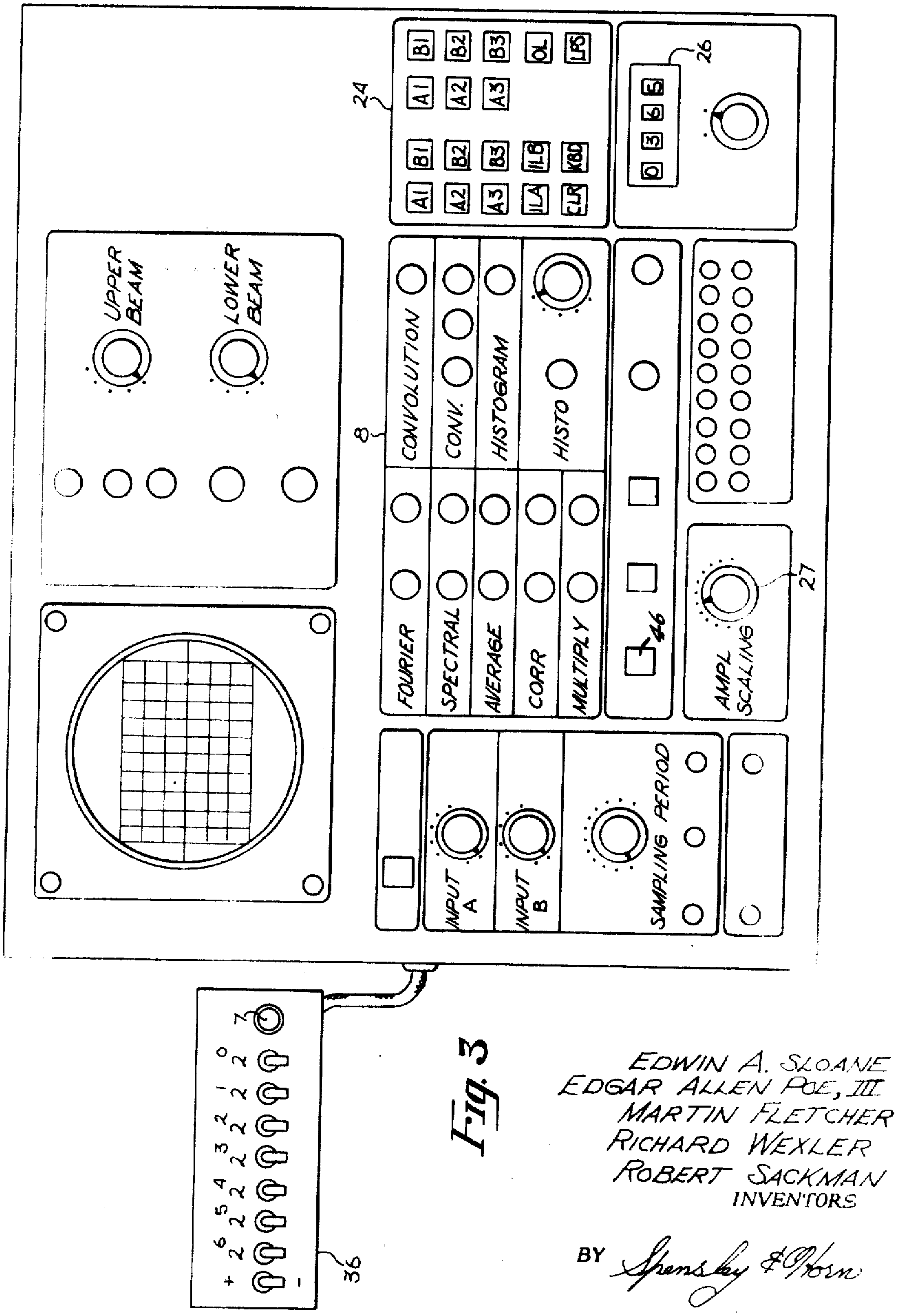
FIG. 3 is the control panel for a computer.

In FIG. 3, the computer control panel is illustrated with the transfer control panel 24 illustrated as a part of the computer control panel. Thumbwheel selector 26 and keyboard 36 are also shown in FIG. 3. The selection of the desired algorithm is made by the operator by depressing one of the indicated selectors within panel 8. The portion of the computer controls designated as control panel 24 is divided into two sets of controls, the first set headed by the word "source" and the second by the word "destination." The "source" switches operate to provide stored signals from a particular section of memory 10. The "destination" on each of the switches operate to determine the section of the memory to which they will be transferred. The letters A1, B1, A2, B2, A3 and B3 on both the source and destination controls of the control panel 24 correspond on the same alphanumeric designations shown in memory 10 (FIGS. 1 and 4). The ILA and ILB switches of the source controls indicates the source is to be input means 16 of FIG. 1. The CLR switch on the source controls 24 indicates that the designated section is to be cleared, and the KBD switch indicates that the source of a word is to be keyboard 36. The OL switch of the destination control indicates that the stored signals are to be transferred to the output lines indicated by leads 19 of FIG. 1.

From the operator's standpoint, the transfer of data simply requires the operator to press the reset button to clear the control panel and logic circuitry associated therewith including means 14 and then to press a source, a destination and the start switch. This transfers the data from the source to the destination selected. In the case of selecting the keyboard as a source, the address of the selected word is designated on thumbwheel 26 and the value of the word is determined by means 36.

The operation of the transfer means may be readily understood from the block diagram of FIG. 4 and the control panel of FIG. 3. The operator selects the source and destination switches of panel means 24 (FIG. 3), which results in source and destination signals being transmitted to control and instruction logic means 14 of FIG. 1 where the logic circuitry for the computer and the transfer operation is contained. In essence, the depression of source and destination switches enables a circuit path from one section of the memory to another section of the memory. A signal is supplied to memory 10 (e.g., the memory selector thereof) to accomplish this. In addition, control panel 24 switches provide the base address for both the source and destination of the selection to memory adder 32. The base address is the address which designates the first word in a particular section. The combination of the base address signal and the signal from the control and instruction logic means 14 enables the transfer. If the keyboard is selected on control panel 24, logic circuitry associated with panel means 24 then senses the address on thumbwheel 26 and this address is then transmitted to memory adder 32.

When the operator presses the start control 46 shown in FIG. 3, control and instruction logic means 14 begins providing word count signals. These word count signals are provided by the basic computer clock through lead 38. On each signal memory address means 34 selects a single word from the appropriate source section and then provides an address for storing a word in the appropriate destination section of memory 10. Memory adder 32 receives the base address from both the source and destination sections of memory 10 selected on control panel 24. When a word count signal is propided to memory adder means 32 via lead 38, memory adder means 32 adds "one" to both base addresses. Therefore, after each word is read out of the source section and into the destination section, memory address means 34 receives the next address from adder means 32. The word count signals are provided until the last word has been transferred to the appropriate section of memory 10.

When the word is selected from memory 10, it is transmitted to memory output bus 22 and then to the input data register means 30. The word is then transmitted to memory 10 via the memory input bus 20. Memory address means 34 provides the correct address for storing the word in the appropriate destination memory section of means 10. This process is repeated for every word count signal received on lead 38 until the entire selected source section in memory 10 has been transferred to the destination section of memory 10. If A3 or B3 is selected as the source of the signals to be transferred, a switch within input data register 30 couples each output lead 29 of the scaler 28 which has an input connected to the memory output bus 22 to memory input bus 20. Switching signals for input register 30 are provided by control and instruction logic means 14 of FIG. 1 through lead 42. A signal thus selected from memory section A3 or B3 is transferred to register 30 via scaler means 28. As the 18-bit word from sections A3 or B3 passes through scaler 28, eight (8) bits are selected and then transmitted to register 30. Scaler 28 selects eight (8) adjacent bits corresponding to the position of scaler switch 27. The word is then suitable for storage in sections A1, B1, A2 or B2 and is transferred into the appropriate destination section of memory 10 as described above.

If sections A1 or B1 of memory 10 are selected as a destination, the section not selected is read out of memory 10 and returned to its previous location in memory 10 via register 30. For example, if Al is selected as the destination, the words stored in section B1 are read out of memory 10 and returned to their previous location along with the new words for section A1. This is done since sections A1 and B1 share common 18-bit cells within memory 10. The similar operation is performed if sections A2 or B2 are selected as the destination.

In the situation where keyboard 36 is selected as the source of data to be transferred into a destination section of memory 10, associated circuiting of control panel means 24 senses the word address selected on thumbwheel 26 and transmits this address to memory adder 32. In this situation, when the operator presses control button 7, shown in FIG. 3, memory adder 32 provides a single address and control and instruction logic means 14 provides timing signals only for the storage of a single word. The value of the word selected on keyboard 36 is read into memory 10 via register 30 and memory input bus 20.

Thus, it is possible to transfer the information stored in any of the sections of memory 10 to any other section within memory 10. In addition, a single word selected on keyboard 36 may be addressed and stored within memory 10. The value of the word on keyboard 36 is selected by the eight (8) switches on keyboard 36, the position of each switch indicating the state of each bit within the word.

Figure 2A:
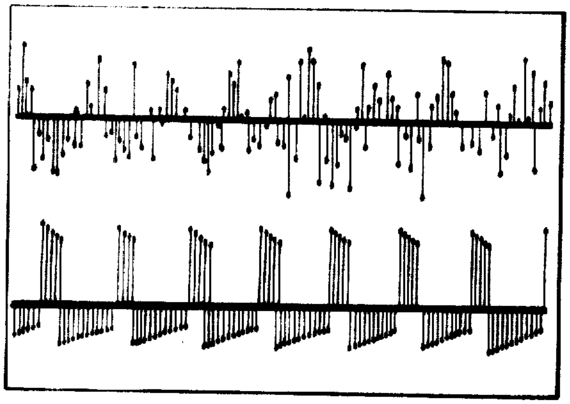
FIG. 2*a* illustrates a signal and signal white noise.
Figure 2B:
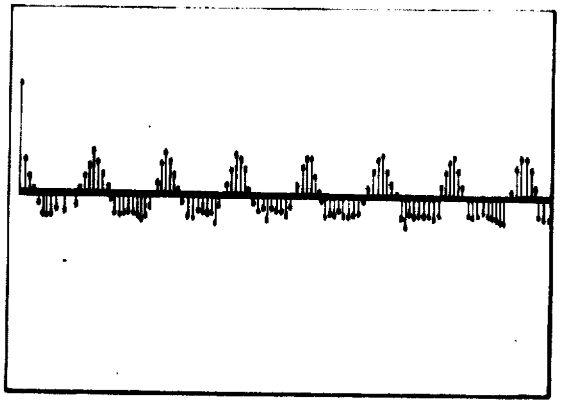
FIG. 2*b* is auto correlation of the signal and noise of FIG. 2*a*.
Figure 2C:
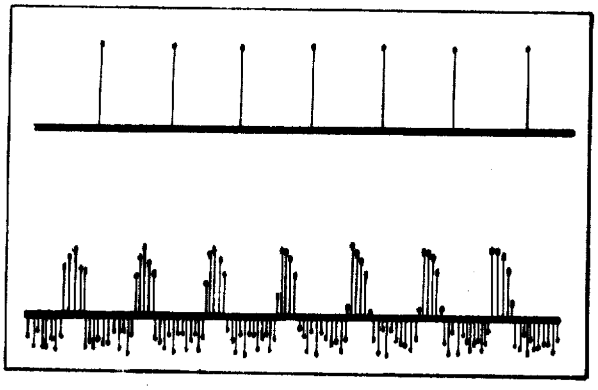
FIG. 2*c* is a series of impulses and the cross correlation of the signal and noise of FIG. 2*a*.

The utility of the above-described transfer means can be appreciated from the curves and graphs shown as FIGS. 2*a* through 2*c*. The upper trace of FIG. 2*a* illustrates a signal buried in white noise. In the lower trace of FIG. 2*a* the signal contained in the upper trace is shown in expanded form without the noise. On visual examination of the upper trace, it is impossible to discern the signal shown in the lower trace. Assume that the signal shown in the upper trace of FIG. 2*a* is supplied to the computer and that it is the object to find if a signal is hidden in the white noise and if possible to reconstruct that signal. First, the upper trace would be stored in one of the input sections of memory 10, for example, section A1.

The computer processor (briefly described herein, but not claimed) performs several algorithms which will enable the operator to determine if a signal is buried in the white noise. For example, if the signal stored in memory section A1 is auto correlated, hidden periodicities are revealed. The results of the auto correlation is shown in FIG. 2*b* and these results are stored in memory 10, section A3. It is obvious from the result of the auto correlation that there is a periodic signal within the white noise and the period of the signal can be readily determined.

Cross correlation is a technique employed for pattern recognition by comparing a data sample with a reference signal. In the above situation, since the period of the unknown signal, that is the signal buried in the white noise has been determined by use of the auto correlation, a comparison can be made with a signal of this period. The operator can supply such a signal, as shown in FIG. 2*c* upper trace, by applying a set of impulses to section B1 of memory 10. This is done by selecting addresses on thumbwheel 26 of FIG. 3 that correspond to the period revealed by the auto correlated signal of FIG. 2*b*. The value of each of the pulses shown in FIG. 2*c* upper trace is selected on keyboard 36 of FIG. 3 and stored in section B1 of memory 10. The data sample of FIG. 2*a* is then retrieved from section A1 of the memory, and the processor performs the cross correlation algorithms on the original signal and the periodic pulses. The result of this algorithm is shown in FIG. 2*c* lower trace. It can be seen that there is a considerable resemblance between the wave forms shown in the lower traces of FIGS. 2*a* and 2*c*.

The results of the cross correlation are stored in section B3 of memory 10. These results can now be transferred back into section A1 or B1 of memory 10 for further operations such as obtaining the Fourier transform of the wave form.

In addition, the manual control means described herein may be an automatically controlled means; for example, one activated by a computer or by a remotely located means.

Thus, by the transfer means herein described, input, output and in-process signals stored in the computer memory may be transferred and different algorithms thus performed on the results of previous computations.

It can be seen that the transfer mode of operation enables time analysis to be performed by an operator at a level of simplicity that approaches the simplicity of operating a common adding machine. The facility to manually move data around a computer and to alter the contents of a memory in combination with a processor for performing a group of related algorithms is a powerful mathematical tool.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

We claim:

1. In a computer comprising a word organized memory storage means in sections for storing input, output and in-process signals where the size of the words stored in said output section is larger than the words stored in said input section, and a process for solving any of a plurality of problems, a memory transfer system comprising:

transfer means coupled to said memory storage means for transferring input signals from one section to another section;

manual control means coupled to said transfer means for operating said transfer means;

scaler means coupled to said transfer means and said memory storage means for selecting a portion of a word; and, whereby words or portions of words stored in said memory storage means may be transferred to another section of said storage means.

2. In a computer comprising at least a first and a second word organized memory storage means in a process for solving any of a plurality of problems, a memory transfer system comprising:

transfer means for transferring signals from one storage means to another memory storage means and for transferring a word from a keyboard to a memory storage means coupled to said memory storage means;

manual control means coupled to said transfer means for operating said transfer means;

a keyboard for manually selecting the value of a word coupled to said transfer means;

whereby signals stored in said storage means may be transferred from one storage means to another storage means and a word may be transferred from a keyboard to the storage means.

3. The transfer system defined in claim 2 wherein said transfer means includes a manually operated selector for selecting an address in the memory storage means for the value of a word selected on said keyboard, coupled to said transfer means and said keyboard means.

4. The transfer system defined in claim 3 wherein said manually operated selector means comprises a thumbwheel selector.

5. In a computer comprising at least an input and an output memory storage means and a processor for solving any of a plurality of problems coupled to said input and said output memory storage means, a memory transfer system comprising:

transfer means coupled to said input and output storage means for transferring signals from said output storage means to said input storage means; and manual control means coupled to said transfer means for operating said transfer means;

whereby a plurality of problems may be successively solved by said processor by transferring the results of one computation from said output memory storage means to said input memory storage means.

6. The transfer system as defined in claim 5 or claim 1 comprising, electrical means for controlling said manual control means, coupled to said manual control means and a remotely located actuation means, for actuating said electrical means, coupled to said electrical means, whereby said manual means may be controlled by a remotely located actuation means.

References Cited

UNITED STATES PATENTS

| | | | |
|---|---|---|---|
| 2,902,217 | 9/1959 | Davis | 340—172.5 XR |
| 2,995,729 | 8/1961 | Steele | 340—172.5 |
| 3,218,611 | 11/1965 | Kilburn et al. | 340—172.5 |
| 3,255,438 | 6/1966 | Leonard et al. | 340—172.5 |
| 3,341,819 | 9/1967 | Emerson | 340—172.5 |
| 3,356,993 | 12/1967 | Sharp | 340—172.5 |
| 3,406,379 | 10/1968 | Palevsky et al. | 340—172.5 |

RAULFE B. ZACHE, Primary Examiner